United States Patent
Bitzer et al.

(10) Patent No.: US 10,199,896 B2
(45) Date of Patent: Feb. 5, 2019

(54) DIRECT CURRENT MACHINE

(71) Applicants: Paul-Gerhard Bitzer, Albstadt (DE); Harald Kauffmann, Albstadt (DE)

(72) Inventors: Paul-Gerhard Bitzer, Albstadt (DE); Harald Kauffmann, Albstadt (DE)

(73) Assignee: Alber GmbH (DE)

( * ) Notice: Subject to any disclaimer, the term of this patent is extended or adjusted under 35 U.S.C. 154(b) by 304 days.

(21) Appl. No.: 15/188,002

(22) Filed: Jun. 21, 2016

(65) Prior Publication Data

US 2016/0380498 A1  Dec. 29, 2016

(30) Foreign Application Priority Data

Jun. 24, 2015  (DE) .................. 10 2015 110 127

(51) Int. Cl.
| | |
|---|---|
| H02K 3/00 | (2006.01) |
| H02K 3/28 | (2006.01) |
| H02K 1/14 | (2006.01) |
| H02K 1/27 | (2006.01) |
| H02K 21/22 | (2006.01) |
| H02K 29/00 | (2006.01) |

(52) U.S. Cl.
CPC .............. *H02K 3/28* (2013.01); *H02K 1/148* (2013.01); *H02K 1/2753* (2013.01); *H02K 1/2786* (2013.01); *H02K 21/22* (2013.01); *H02K 29/00* (2013.01); *H02K 2213/12* (2013.01)

(58) Field of Classification Search
CPC .. H02K 3/18; H02K 3/28; H02K 3/12; H02K 1/2786; H02K 1/2753
See application file for complete search history.

(56) References Cited

U.S. PATENT DOCUMENTS

| | | | |
|---|---|---|---|
| 5,164,622 A | * | 11/1992 | Kordik ............... H02K 3/28 310/156.26 |
| 7,936,099 B2 | | 5/2011 | Staudemann et al. |
| 2008/0231133 A1 | | 9/2008 | Staudemann et al. |
| 2009/0309452 A1 | | 12/2009 | Tao et al. |

(Continued)

FOREIGN PATENT DOCUMENTS

| | | |
|---|---|---|
| DE | 199 83 946 T1 | 10/2001 |
| DE | 21 2006 000 034 U1 | 1/2008 |
| DE | 20 2009 007 654 U1 | 10/2009 |

(Continued)

*Primary Examiner* — Hanh N Nguyen
(74) *Attorney, Agent, or Firm* — Steven A. Nielsen; www.NielsenPatents.com

(57) ABSTRACT

A direct current machine comprises a stator and a rotor, one of them having a plurality of magnets alternatively magnetized north and south and the other one of them having a plurality of coils formed by winding insulated wire around teeth in order to provide a three-phase winding, wherein slots are formed between said coils and the coils are grouped in coil groups of four coils each, and a current controlled inverter for driving said machine, wherein each coil group has the same winding pattern so that each first coil of a coil group, seen in a direction of rotation, is wound in the same winding direction and two, in the direction of rotation, consecutive coil groups of the same phase are connected such that current flows through one in the direction of rotation and through the other one in a direction opposite to the direction of rotation.

6 Claims, 4 Drawing Sheets

(56) References Cited

U.S. PATENT DOCUMENTS

2013/0119809 A1\* 5/2013 Levesque ................. H02K 3/28
　　　　　　　　　　　　　　　　　　　　　　　310/156.43
2015/0303780 A1\* 10/2015 Kim ....................... H02K 21/12
　　　　　　　　　　　　　　　　　　　　　　　310/68 B

FOREIGN PATENT DOCUMENTS

| DE | 199 83 946 B4 | | 4/2010 | | |
|----|---------------|---|--------|---|---|
| EP | 1 499 003 A1 | | 1/2005 | | |
| EP | 1913675 A1 | | 4/2008 | | |
| WO | WO 2000/60724 A1 | | 10/2000 | | |
| WO | WO 2007/012207 A1 | | 2/2007 | | |
| WO | WO 2013/147550 | \* | 10/2013 | ............... | H02K 3/48 |

\* cited by examiner

Fig. 5
Fig. 6
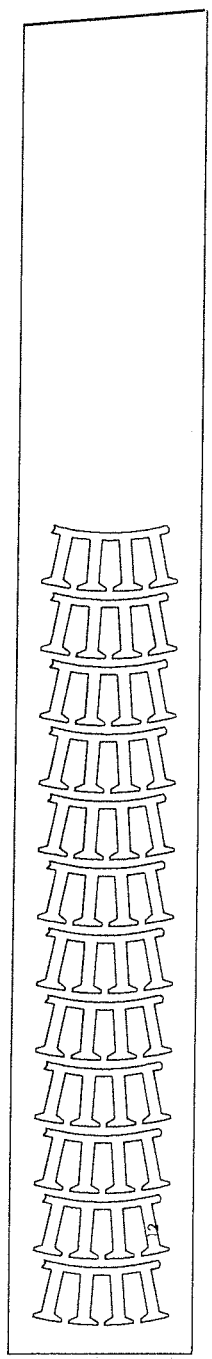
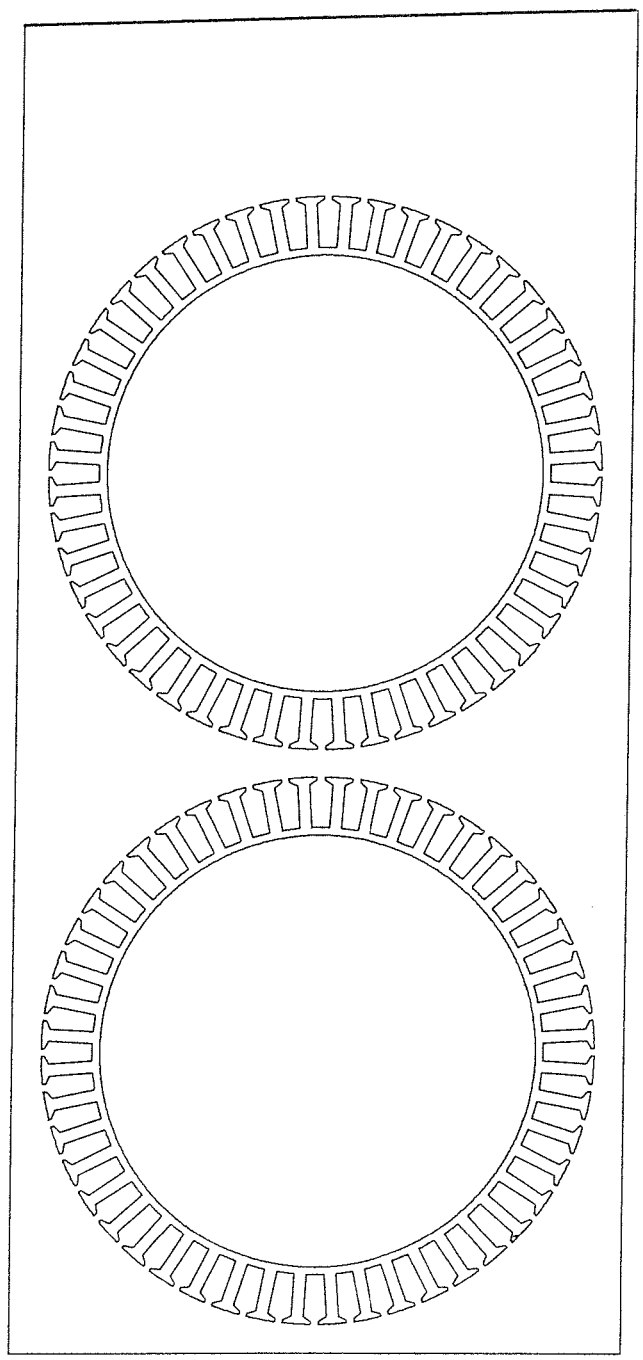
PRIOR ART

DIRECT CURRENT MACHINE

RELATED PATENT APPLICATION AND INCORPORATION BY REFERENCE

This is a utility application based upon and claims the benefit of and priority date of German patent application DE 10 2015 110 127.0 filed on Jun. 24, 2015. This related application is incorporated herein by reference and made a part of this application. If any conflict arises between the disclosure of the invention in this utility application and that in the related application, the disclosure in this utility application shall govern. Moreover, the inventor(s) and or the applicant incorporate herein by reference any and all patents, patent applications, and other documents hard copy or electronic, cited or referred to in this application.

BACKGROUND OF THE INVENTION (1) Field of the Invention

The invention generally relates to direct current machines. More particularly, the invention relates to an electrically or permanent excited brushless direct current machines. Disclosed embodiments may be used as a motor for propelling a bicycle or other vehicle, as a generator for energy recuperation and as a battery charger.

(2) Description of the Related Art

German patent DE 199 83 946 B4 discloses a system or machine of two components, sometimes called a rotor and stator, wherein the rotor and stator are concentrically orientated to one another. One of the two components, typically either the rotor or the stator, has a specific number of magnets, such as permanent magnets, wherein the magnets are alternatively magnetized north and south, and the respective other part (either the rotor or stator) has a specific number of coils which are formed by teeth around which insulated wire is wound. Between these coils there are formed respective slots. Accordingly, these slots are the gaps between adjacent teeth. Between these coils there are formed respective slots.

The concept whether the rotor is disposed within or outside the stator and which of both components is provided with the permanent magnets, while then the other component has the coils and slots, is particularly determined or suggested by the respective use or application of the machine. Document DE 199 83 946 B4 discloses a permanent magnet brushless direct current machine which is used as a drive for a bicycle in a wheel in the form of a hub motor, wherein the central part is disposed in a stationary manner and therefore is the stator and has the coils and the slots, respectively, and where the rotor is an outer rotor provided with permanent magnets. Fed by a rechargeable battery as a power source, the motor can be used as a drive as well as a generator for energy recuperation and charging of the battery. The drive of the machine is effected in a normal manner via a current controlled inverter having three phases.

The number of poles, i.e. magnetic poles, and the number of slots, i.e. coils, are significant features in the design of such a machine. Document DE 1 99 83 946 B4 discloses for instance a kind of machine having twenty-two poles and twenty-four slots and a further machine variant having forty-four poles and forty-eight slots.

In addition to the numbers of poles and slots, the so called pole-slot-combination, there are further features of such a machine which are decisive for its characteristics. These include the kind of winding and the manner, in which the winding of the coils is connected, i.e. the so called coil groups wiring concept. The coils can be combined in groups and the wiring can be in the form of a star connection or in the form of a delta connection. Document DE 1 99 83 946 B4 for instance discloses the winding pattern C', C, C', C; B, B', B, B'; A', A, A', A; C, C', C, C'; B', B, B', B; A, A', A, A' in case of an assembly having two coils per slot and an assembly having four coils in one group.

The kind of winding and the connection of the windings, i.e. the wiring concept as well as the assembly in groups, have to be taken into account already upon design of a machine. Respective terminals have to be planned and must be provided and a wiring machine which requires a substantial investment volume has to be designed and programmed.

In case of the winding pattern according to DE 1 99 83 946 B4, specifically as shown in FIG. 4 of this document, winding of each tooth in a group of four teeth starts with a winding in the counter clockwise direction (C'), followed by a winding in a clockwise direction (C), wherein the first group of four ends with a clockwise winding direction (C'CC'C) and the next group of four for the next phase, namely phase C in the present case, starts with a winding in clockwise direction C and ends in counter clockwise direction C'. For the sake of clarity, intervening coil groups, such as B and A are not shown between the two C coil groups of FIG. 4.

This known winding pattern as shown in FIG. 4 of DE 1 99 83 946 B4 is shown, for the sake of clarity, in a plan view of a corresponding stator in FIG. 3 of the present application. The known winding pattern and the respective winding directions are also shown, in an enlarged and in a sectional view, in FIG. 4 of the present application. As can be taken from the depictions of FIG. 4, the first coil group of a phase, such as phase U having four coils, seen from the left-hand side of the depiction, starts with a counter clockwise (ccw) winding (as depicted by a curved arrow above the coil) for the first coil and the coil group ends with a clockwise winding (cw) for the fourth coil, seen from the left-hand side. The fifth coil from the left-hand side, that is the first coil of the second phase U coil group, four coils, is wound in a clockwise direction and the eighth coil seen from the left hand side, that is the fourth and last coil of the second phase U coil group having four coils, is wound in a counter clockwise direction. Thus, in the prior art, coil groups of the same phase have different coil configurations.

Accordingly, this known winding pattern requires that there must be provided and wound two different coil groups of four coils, namely one coil group of four coils where the winding starts in a clockwise direction and another coil group of four coils where the winding starts with a counter clockwise direction. This is detrimental for a number of reasons as explained in the following.

Usually, stator cores of electric motors of the present kind consist of a package of single metal sheets being superimposed. A typical stator core has for instance 40 to 50 layers of single metal sheets. The single metal sheets are usually punched from metal sheet strips which are wound from coils. The punching can be effected either by punching complete rings or by punching segments of four. As shown in FIGS. 5 and 6, punching of segments of four leads to less waste then punching of complete rings. Furthermore, the punching device for a segment of four can be smaller and therefore less expensive.

In the course of manufacturing of an electric motor, the stator core is covered with insulation. Such stator insulation for instance can be done by injection molding. In order to do so, for instance either the stack or packet of metal sheet rings or the assembly of a corresponding number of a metal sheet stack for four coils is inserted in an injection molding tool and is insert molded with plastic. In this injection molding process, a thread style profile is provided in the area surrounding the teeth. While this makes the injections mold more complex and more expensive, it provides, on the other hand, that in the winding process at a later stage of the manufacturing process, when wire is wound around the teeth, the available space is used in an optimal way. The stator insulation in the form of an injection molded plastic part also serves to keep the metal sheet packet together. The single metal sheets are superimposed in a non-conductive manner, for instance with a non-conductive insulation layer in between.

As follows from the above, providing and using single coil groups, for instance coil groups of four coils, provides advantages in the process of manufacturing not only as far as punching is concerned but also in the process of insert molding since not the entire ring needs to be insert molded but just the respective coil groups of four coils which makes it possible to use a considerably smaller and therefore less expensive injection mold.

However, according to the prior art as known from DE 1 99 83 946 B4, two different kinds of coil groups of four coils are needed and, accordingly, also two different kinds of injection molding forms need to be provided. The prior art lacks any suggestion, solution or means to implement a single coil group solution. Thus there is a need in the art for means and methods of powering or otherwise enabling a single coil group solution.

In other words, the prior art, in particularly DE 1 99 83 946 B4, assigned to EPS Energy and Propulsion Systems, Inc. requires two different sets of coil groups for each phase. Referring to prior art FIG. 3, exemplifying the EPS Energy and Propulsion Systems prior art cited herein, four groups of coils are illustrated. These four groups represent phase U of a three phase system. The first coil group is marked 1 to 4, the second coil group 13 to 16, the third coil group 25 to 28 and the fourth coil group 37 to 40. Each of the four coil groups has four coils, but other configurations are contemplated. The first group starts out with a first coil (1 ccw) having a counter clockwise winding. The next three coils, 2 to 4, alternate the direction of winding. As mentioned above, the tooling, fabrication and/or injection molding for a group of coils is unduly expensive and labor intensive. Unfortunately, for the next coil group in the same phase, a completely different coil group is required. The second group starts out at 13 cw with a clockwise winding. The remaining coils of the second group, 14 to 16, alternate winding direction. A quick review and comparison of 1 ccw, 13 cw, 25 ccw and 37 cw illustrates the prior art shortfall of two different coil groups for the same phase. Thus, there is ample room in the art for improvement.

BRIEF SUMMARY OF THE INVENTION

The present invention overcomes shortfalls in the related art by presenting an unobvious and unique combination, configuration and use components to provide a direct current machine which, specifically in view of the prior art shortfalls discussed above, offers benefits with respect to efficient design and cost effective manufacturing. In particular a single coil group solution is disclosed and an enabling electrical powering system and method is disclosed.

Shortfalls in the prior art are solved by the disclosed embodiments wherein a direct current machine may comprise a stator and a rotor, wherein either the stator or the rotor comprises a plurality of magnets alternatively magnetized north and south and wherein the stator or the rotor has a plurality of coils formed by winding insulated wire around teeth in order to provide a three-phase winding, wherein slots are formed between said coils and the coils are grouped in coil groups of four coils each, and a current controlled inverter for driving said machine, wherein each coil group has the same winding pattern such that each first coil of a coil group, seen in a direction of rotation, is wound in the same winding direction;

and, to artfully enable the disclosed single coil group solution, a new current flow is disclosed wherein current flows in a first direction through the coils of a first coil group and then for the second coil group of the same phase, current flows in an opposite second direction through the coils of the second coil group., In one disclosed embodiment the stator has the coils and the rotor has the magnets. In another disclosed embodiment the stator disposed inside the rotor and the rotor is disposed as an outer rotor. In another disclosed embodiment the number of coils for each phase is an integer multiple of eight. In another disclosed embodiment the number of coils is forty-eight and the number of magnets is forty-four.

Due to the winding pattern of the present invention, the direct current machine according to the present invention makes it possible to use identical coil groups of four coils to form the stator. If for a direct current machine according to the present invention the stator is composed of respective coil groups of four coils, only one injection mold is required for injection molding the plastic around the coil groups of four coils since all coil groups of four coils have the same winding pattern and, accordingly, the thread-like profile in the area around the teeth is identical for all coil groups of four coils.

A further aspect for reducing costs follows from the winding of the teeth since the coil groups of four coils can be wound separately so that in case of only one kind of a coil group of four coils only one winding process is required. The respective coil groups of four coils can then be mounted on a carrier and the respective ends of the windings can be connected so that for instance either a star connection or delta connection is provided.

The decision whether in the manufacturing process of the stator of a direct current machine according to the present invention single segments are used, for instance coil groups of four coils, or whether a complete ring is used, depends inter alia on the envisaged production number. Particularly in case that only a small number of items are to be produced, the use of single segments is more economic due to the factors as explained above. On the other hand, in case of large piece numbers, i.e. when mass production is started, the use of complete rings can be a more economical solution for manufacturing the stator rings in spite of the higher costs for punching.

The winding pattern according to the present invention provides the option to choose either single segment coil groups or full rings for the stator which provides the key advantage that in case of a small test series or in case of prototypes respective single coil groups can be used which makes the manufacturing thereof considerably less expensive, while in later large-scale production where full rings are used the same and, accordingly, a tested winding pattern can be maintained.

Basically, either the rotor or the stator can have the coils, wherein in such case, respectively, the stator or the rotor has the magnets. Furthermore, the direct current machine according to the present invention can have an outer rotor, which means that the stator is inside the rotor, or an inner rotor, which means that the rotor is inside the stator.

One embodiment which is well suited to be used as a hub motor in a bicycle is designed such that the stator has the coils and the rotor has the magnets. In this embodiment, the stator is disposed inside the rotor and the rotor is designed as an outer rotor.

The number of coils per phase is preferably an integer multiple of eight. In a preferred embodiment of the invention, the number of coils is forty-eight and the number of magnets is forty-four.

In the following, disclosed embodiments are further illustrated and described.

BRIEF DESCRIPTION OF THE DRAWINGS

FIG. 4 is an enlarged partial view of the (prior art) stator according to FIG. 3

FIG. 5 and FIG. 6 show in a schematic manner sheet metal stripes to be punched as elements of a stator core according to the prior art.

These and other aspects of the present invention will become apparent upon reading the following detailed description in conjunction with the associated drawings.

DETAILED DESCRIPTION OF EMBODIMENTS OF THE INVENTION

The following detailed description is directed to certain specific embodiments of the invention. However, the invention can be embodied in a multitude of different ways as defined and covered by the claims and their equivalents. In this description, reference is made to the drawings wherein like parts are designated with like numerals throughout.

Unless otherwise noted in this specification or in the claims, all of the terms used in the specification and the claims will have the meanings normally ascribed to these terms by workers in the art.

Unless the context clearly requires otherwise, throughout the description and the claims, the words "comprise," "comprising" and the like are to be construed in an inclusive sense as opposed to an exclusive or exhaustive sense; that is to say, in a sense of "including, but not limited to." Words using the singular or plural number also include the plural or singular number, respectively. Additionally, the words "herein," "above," "below," and words of similar import, when used in this application, shall refer to this application as a whole and not to any particular portions of this application.

One embodiment of a direct current machine according to the present invention corresponds, except for the winding pattern and the corresponding wiring of the coils, basically to the permanent magnet brushless direct current machine disclosed in DE 1 99 83 946 B4 which is mounted as a hub motor in a wheel as a bicycle drive, wherein the central part is arranged in a stationary manner and therefore is the stator having coils and slots and the rotor is an outer rotor having permanent magnets and which can be used, fed by a rechargeable battery as power source, as a motor for driving and as a generator for energy recuperation and recharging of the battery. The control of this machine is effected in a known manner via a current controlled inverter having three phases.

One embodiment of the direct current machine according to the present invention described here has forty-four poles and magnets, respectively, and forty-eight slots and coils, respectively. The coils are assembled in coil groups of four coils.

Figure 1:
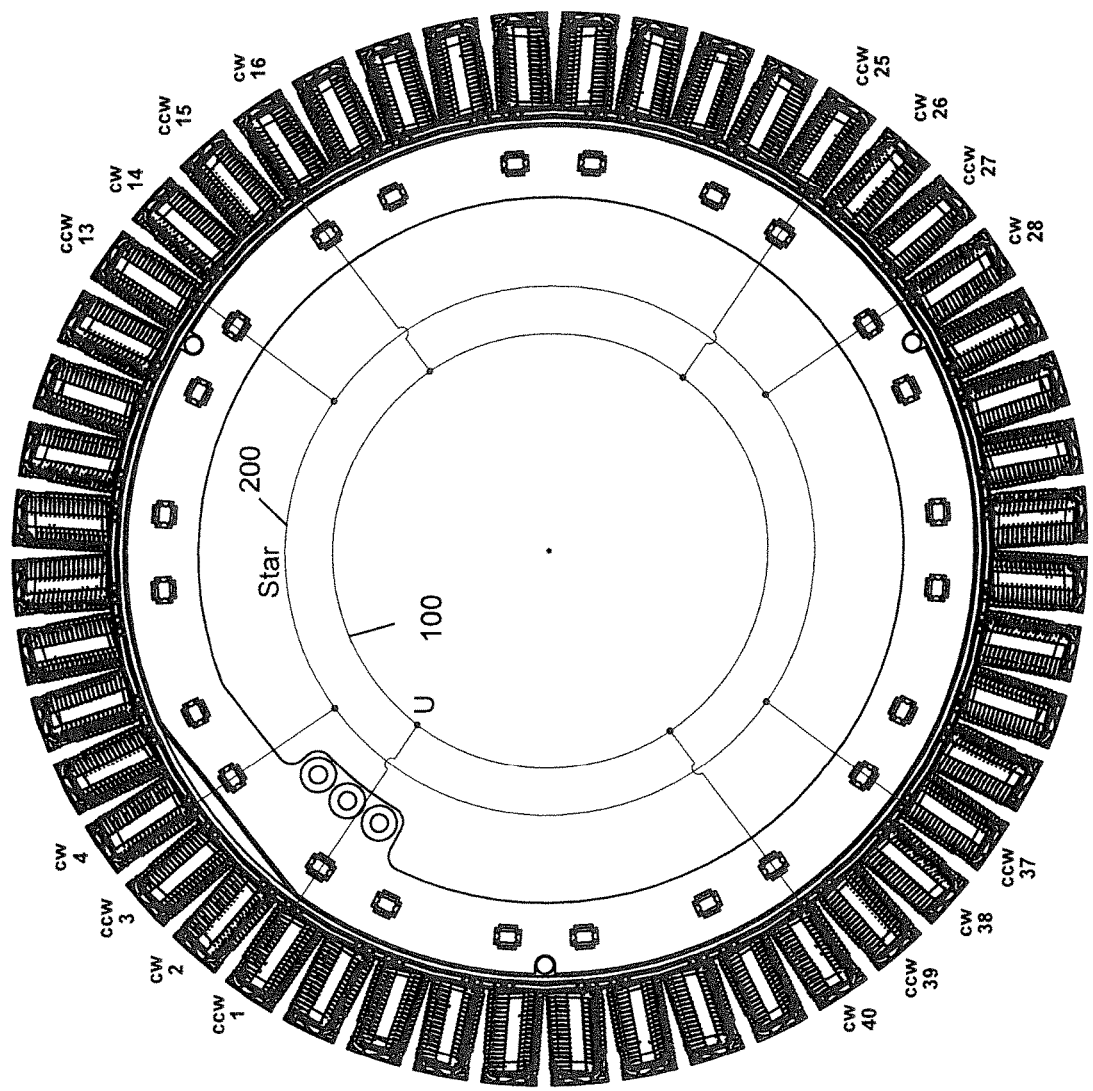
FIG. 1 is a plan view of a stator of an embodiment of a direct current machine according to the present invention

FIG. 1 shows a presently disclosed embodiment having a stator of forty-eight coils which, starting with coil 1, are numbered in a clockwise sense wherein for the purpose of clarity only the coils of one phase, namely phase U in the present case, are provided with numbers. In case of the coils of phase U, that is coils 1, 2, 3, 4, 13, 14, 15, 16, 25, 26, 27, 28 and 37, 38, 39 and 40, also the winding sense or the winding direction, respectively, is indicated, wherein ccw stands for counter clockwise and cw stands for clockwise.

Figure 2:
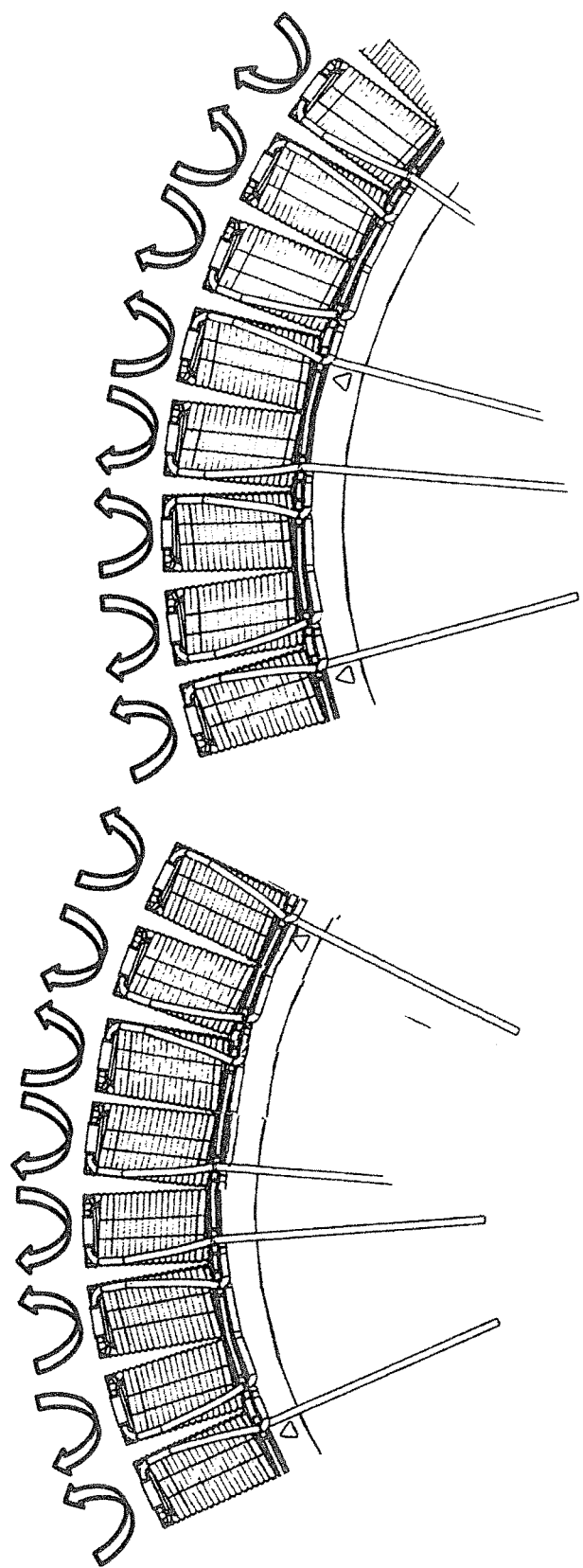
FIG. 2 is an enlarged partial view of the stator according to FIG. 1.
Figure 3:
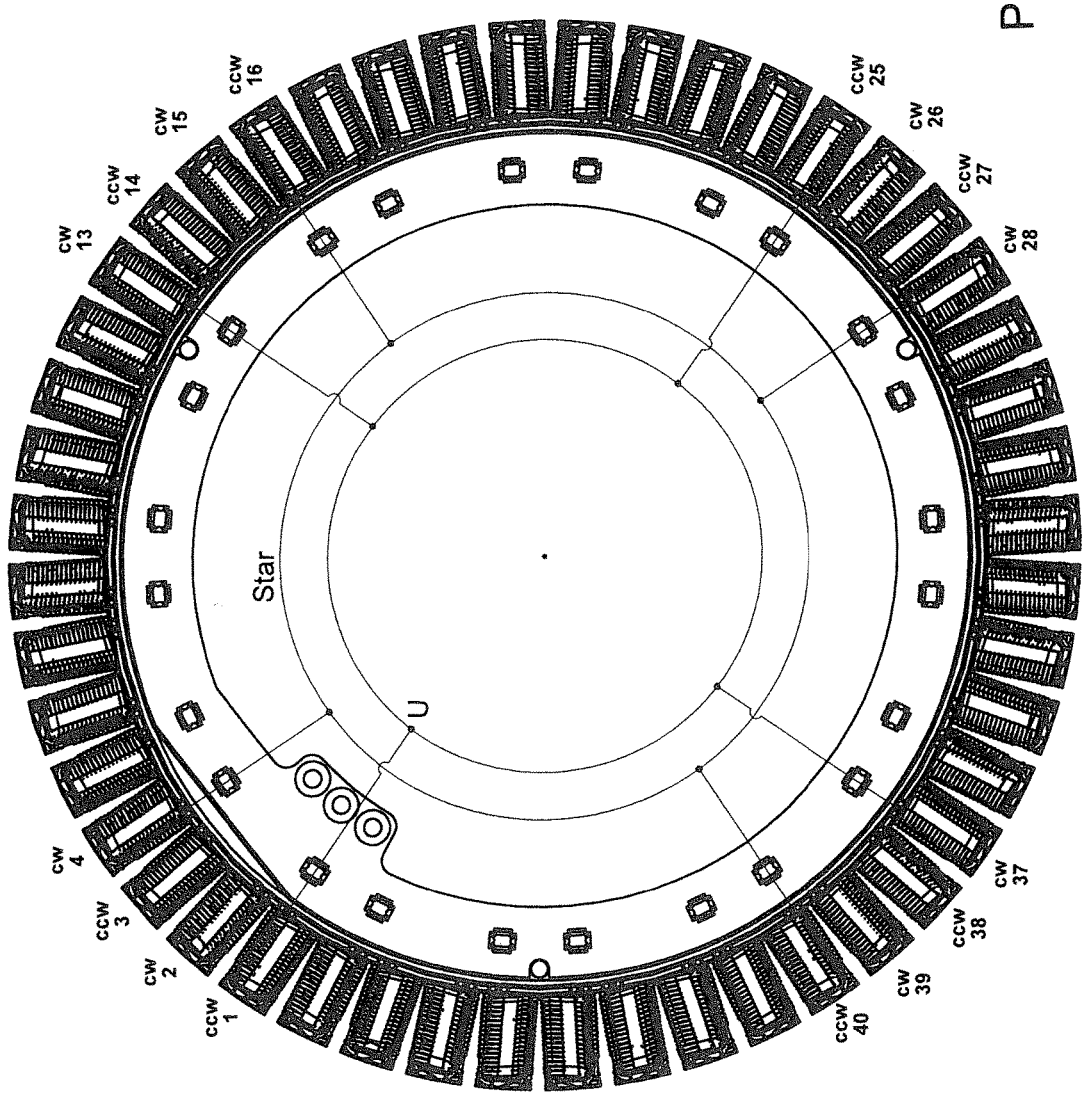
FIG. 3 is a plan view of a stator of a known (prior art) direct current machine.

As can be seen from FIG. 1 and from the enlarged depiction according to FIG. 2, each coil group of four coils has the same winding pattern. It begins, if in the depiction according to FIG. 1 the counter clockwise sense is defined as the sense of rotation, with a winding of the respective first coil of each coil group of four coils in a counter clockwise sense and ends with the respective fourth and last coil of each coil group of four coils in the clockwise sense. Accordingly, the winding patterns of all coil groups of four coils are identical.

It is understood that in case of a different embodiment also a different winding scheme can be selected for all coil groups of coils, which for a coil group of four coils begins with a winding in clockwise direction for the first coil and ends with a winding in the counter clockwise direction for the fourth and last coil.

The wiring concept of the coil groups for the present embodiment is also shown in FIG. 1. Referring to FIG. 1, the inner ring 100 is the positive pole of phase U and the second ring seen from the center, i.e. ring 200 being outside the first ring 100, represents the negative pole of phase U. Accordingly, the current flows through coils 1 to 4 in the direction or a first direction of 1, 2, 3, 4, and current flows through coils 13 to 16 in a second opposite direction 16, 15, 14, 13, for the third coil group of the same phase, current follows through the coils 25 to 28 in the first direction 25, 26, 27 and 28 and through coils 37 to 40 in the second opposite direction 40, 39, 38 and 37. The disclosed sequencing or direction of current passing through the coils may sometimes be referred to as a "direction of coil sequencing" or a "current direction of coil sequencing."

In other words, through the first coil group of four coils having coils 1 to 4 and through the third coil group of four coils having coils 25 to 28, the numbering of coil groups referring to the direction of rotation, i.e. in the present case in the clockwise direction, the current flows in the direction of rotation, i.e. in the clockwise direction, and it flows through the second coil group of four coils having coils 13 to 16 and through the forth group of four coils having coils 37 to 40 in the direction opposite to the direction of rotation, i.e. in the counter clockwise direction. The wiring pattern therefore is such that for two, in the direction of rotation, subsequent groups of coils having the same phase, for instance the first coil group of four coils having coils 1 to 4 and the second coil group of four coils having coils 13 to 16, are connected such that current flows through one coil group, the first coil group of four coils having coils 1 to 4, in the direction of rotation and through the other coil group of four coils, the second coil group having coils 13 to 16, opposite to the direction of rotation. In certain embodiments, the stator may not rotate, wherein a direction of rotation may refer to a clockwise direction upon the stator and the coils of the stator.

By providing this specific wiring pattern it is possible to obtain the same magnetic orientation as disclosed in the prior art according to DE 199 83 946 B4 although identical coil groups of four coils are provided in accordance with the present invention.

The disclosed wiring pattern provides manufacturing efficiencies over the prior.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while steps are presented in a given order, alternative embodiments may perform routines having steps in a different order. The teachings of the invention provided herein can be applied to other systems, not only the systems described herein. The various embodiments described herein can be combined to provide further embodiments. These and other changes can be made to the invention in light of the detailed description.

All the above references and patents and applications are incorporated herein by reference. Aspects of the invention can be modified, if necessary, to employ the systems, functions and concepts of the various patents and applications described above to provide yet further embodiments of the invention.

These and other changes can be made to the invention in light of the above detailed description. In general, the terms used in the following claims, should not be construed to limit the invention to the specific embodiments disclosed in the specification, unless the above detailed description explicitly defines such terms. Accordingly, the actual scope of the invention encompasses the disclosed embodiments and all equivalent ways of practicing or implementing the invention under the claims.

While certain aspects of the invention are presented below in certain claim forms, the inventors contemplate the various aspects of the invention in any number of claim forms.

What is claimed is:

1. A direct current machine, the machine comprising:
   a) a rotor comprising a plurality of magnets alternatively magnetized north and south;
   b) a stator comprising a plurality of coils formed by winding insulated wire around teeth attached to the stator in order to provide a three-phase winding, wherein voids are defined between the coils and the coils are grouped in a plurality of coil groups of four coils each, and
   c) a current controlled inverter for providing electrical current to the machine;
   d) each coil group has the same winding pattern so that each first coil of a coil group, is wound in the same winding direction; and,
   e) electrical current flows in a first direction through a first group of coils of a phase and electrical current flows in an opposite second direction in a second coil group of the phase.

2. The machine of claim 1 wherein the stator is disposed inside of the rotor.

3. The machine of claim 2 wherein the rotor is disposed outside of the stator.

4. The machine of claim 3 wherein the number of coils for each phase in an integer multiple of eight.

5. The machine of claim 4 wherein the number of coils is forty-eight and the number of magnets is forty-four.

6. The machine of claim 2 wherein the stator remains stationary and the rotor rotates within the stator and wherein the stator comprises an inner first ring and an outer second ring wherein the inner first ring is connected to a positive pole of the phase as generated by the stator and the outer second ring is connected to a negative pole of the phase as generated by the stator.

* * * * *